United States Patent
Faher et al.

(10) Patent No.: US 9,396,506 B2
(45) Date of Patent: Jul. 19, 2016

(54) SYSTEM PROVIDING AN IMPROVED SKIMMING RESISTANCE FOR AN ELECTRONIC IDENTITY DOCUMENT

(75) Inventors: Mourad Faher, Meudon (FR);
Stéphane Mouille, Meudon (FR);
Bruno Rouchouze, Meudon (FR)

(73) Assignee: GEMALTO SA, Meudon (FR)

( * ) Notice: Subject to any disclaimer, the term of this patent is extended or adjusted under 35 U.S.C. 154(b) by 69 days.

(21) Appl. No.: 13/977,726

(22) PCT Filed: Dec. 15, 2011

(86) PCT No.: PCT/EP2011/072984
§ 371 (c)(1),
(2), (4) Date: Jun. 30, 2013

(87) PCT Pub. No.: WO2012/089533
PCT Pub. Date: Jul. 5, 2012

(65) Prior Publication Data
US 2013/0311788 A1    Nov. 21, 2013

(30) Foreign Application Priority Data
Dec. 31, 2010 (EP) .................................. 10306546

(51) Int. Cl.
*G06F 21/35* (2013.01)
*G06Q 50/26* (2012.01)
(Continued)

(52) U.S. Cl.
CPC .............. *G06Q 50/265* (2013.01); *G06F 21/35* (2013.01); *G06F 21/602* (2013.01); *G06K 19/08* (2013.01);
(Continued)

(58) Field of Classification Search
CPC .......... G06F 21/35; G06F 21/30; G06F 21/44
USPC ........................................................... 713/189
See application file for complete search history.

(56) References Cited

U.S. PATENT DOCUMENTS 5,448,045 A * 9/1995 Clark .............................. 235/382
6,567,915 B1 * 5/2003 Guthery ............... G06Q 20/105
705/17
(Continued)

FOREIGN PATENT DOCUMENTS

DE        20100158 U1    5/2002
EP         1975885 A1   10/2008
(Continued)

OTHER PUBLICATIONS

Omura J K: "A smart card to create electronic signatures", 19890611; 19890611-19890614, Jun. 11, 1989, pp. 1160-1164, XP010081240, abstract.
(Continued)

*Primary Examiner* — Dao Ho
*Assistant Examiner* — Cheng-Feng Huang
(74) *Attorney, Agent, or Firm* — The Jansson Firm; Pehr Jansson

(57) ABSTRACT

The invention relates to a secured identity document having an externally readable chip storing a cryptographic configuration of the chip, defining the cryptographic security levels supported by the chip, for establishing a secure communication with a controlling terminal, storing a private key of a cryptography key pair and adapted to cipher data based on the stored private key; a support to which the chip is fastened, the support having a machine optically readable area, the data encoded in this area including the cryptographic configuration of the chip for establishing a secure communication with a controlling terminal in non ciphered form and the cryptographic configuration of the chip ciphered based on said private key.

10 Claims, 3 Drawing Sheets

(51) Int. Cl.

| | |
|---|---|
| *G06K 19/08* | (2006.01) |
| *G06K 19/10* | (2006.01) |
| *G09C 5/00* | (2006.01) |
| *H04L 9/08* | (2006.01) |
| *H04L 9/32* | (2006.01) |
| *G07F 7/08* | (2006.01) |
| *G07F 7/12* | (2006.01) |
| *G07C 9/00* | (2006.01) |
| *G06F 21/60* | (2013.01) |

(52) U.S. Cl.
CPC ............ *G06K 19/10* (2013.01); *G07C 9/00031* (2013.01); *G07F 7/0826* (2013.01); *G07F 7/122* (2013.01); *G09C 5/00* (2013.01); *H04L 9/0897* (2013.01); *H04L 9/3231* (2013.01); *H04L 2209/805* (2013.01)

(56) References Cited

U.S. PATENT DOCUMENTS

| | | | | |
|---|---|---|---|---|
| 2001/0054147 | A1* | 12/2001 | Richards | H04L 9/3271 713/172 |
| 2002/0097159 | A1* | 7/2002 | Hooglander | G06F 19/323 340/573.1 |
| 2003/0023858 | A1* | 1/2003 | Banerjee | H04L 9/3247 713/189 |
| 2003/0222152 | A1* | 12/2003 | Boley, Jr. | G06K 19/06187 235/492 |
| 2004/0199474 | A1* | 10/2004 | Ritter | G06Q 20/00 705/65 |
| 2005/0010776 | A1* | 1/2005 | Kenen | G06Q 20/341 713/176 |
| 2005/0105731 | A1* | 5/2005 | Basquin | G06Q 20/341 380/247 |
| 2005/0114662 | A1* | 5/2005 | Meyer | G06Q 20/341 713/168 |
| 2005/0211785 | A1* | 9/2005 | Ferber | G06K 19/0702 235/492 |
| 2006/0059369 | A1* | 3/2006 | Fayad | G06F 21/6218 713/189 |
| 2006/0099965 | A1* | 5/2006 | Aaron | 455/456.3 |
| 2007/0022053 | A1* | 1/2007 | Waserstein et al. | 705/42 |
| 2007/0063055 | A1* | 3/2007 | Graf et al. | 235/492 |
| 2007/0089168 | A1* | 4/2007 | Wang | G06Q 20/00 726/9 |
| 2007/0245144 | A1* | 10/2007 | Wilson | G06F 21/6254 713/170 |
| 2008/0120712 | A1* | 5/2008 | Ayers | G06F 21/34 726/9 |
| 2008/0163383 | A1* | 7/2008 | Kumar | G06F 21/575 726/29 |
| 2008/0195858 | A1* | 8/2008 | Nguyen | G06F 21/6245 713/151 |
| 2008/0242268 | A1* | 10/2008 | Aaron | H04M 1/72572 455/411 |
| 2008/0263363 | A1* | 10/2008 | Jueneman | G06F 21/32 713/184 |
| 2008/0301464 | A1* | 12/2008 | Parkinson | 713/186 |
| 2009/0090777 | A1* | 4/2009 | Ness | G07C 9/00087 235/441 |
| 2009/0320118 | A1* | 12/2009 | Muller | G06F 21/34 726/9 |
| 2010/0042846 | A1* | 2/2010 | Trotter | G06F 21/31 713/182 |
| 2010/0064136 | A1* | 3/2010 | Longobardi | H04L 9/3268 713/168 |
| 2010/0066072 | A1* | 3/2010 | Paeschke | G06K 19/077 283/83 |
| 2010/0169223 | A1* | 7/2010 | Yuan | G06Q 20/12 705/67 |

FOREIGN PATENT DOCUMENTS

| | | |
|---|---|---|
| EP | 2081135 A2 | 7/2009 |
| WO | WO2009127495 A1 | 10/2009 |

OTHER PUBLICATIONS

PCT/EP2011/072984 International Search Report, Mar. 12, 2012, European Patent Office, P.B. 5818 Patentlaan 2 NL—2280 HV Rijswijk.

* cited by examiner

Fig. 3
Fig. 4
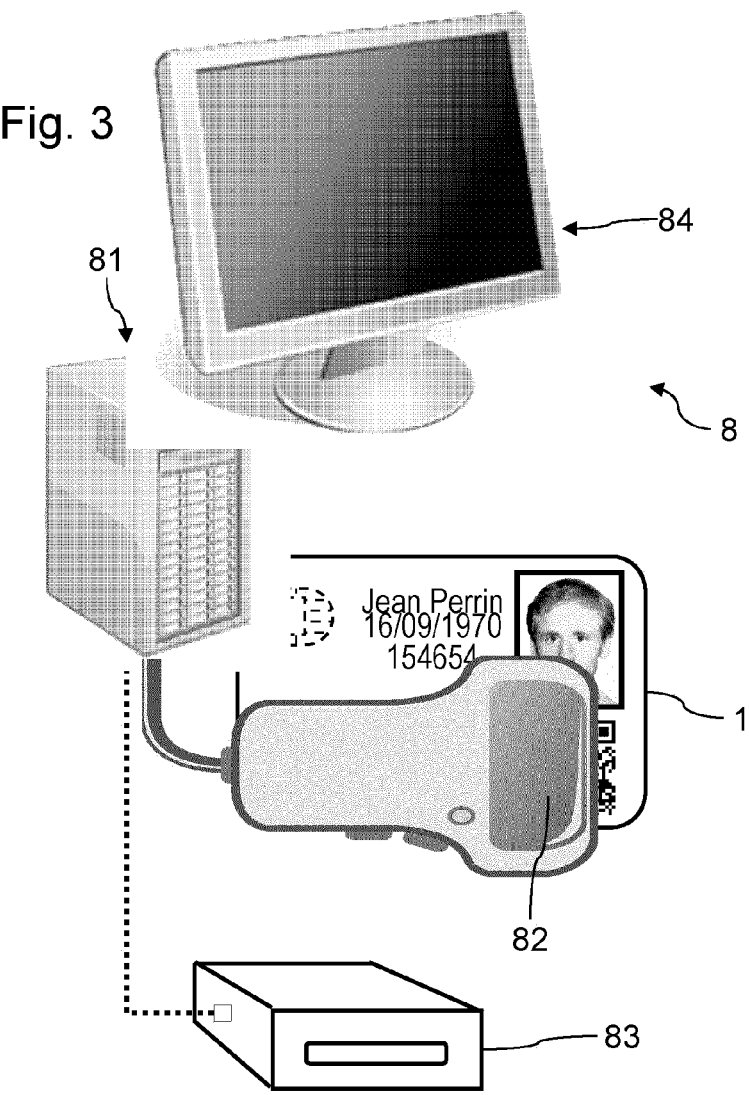
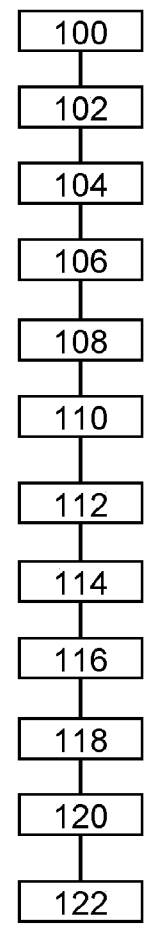

SYSTEM PROVIDING AN IMPROVED SKIMMING RESISTANCE FOR AN ELECTRONIC IDENTITY DOCUMENT

BACKGROUND

The invention relates to the field of personal identification, and in particular to the protection against skimming of identity documents provided with a machine readable electronic chip.

To improve the capacity of a controlling authority (like a law-enforcement or national security agency) to detect fake identity documents, a wide range of identity documents (such as passports, identity cards, driving licenses, resident cards or the like), are provided with a machine readable electronic chip. Such identity documents are intended to reduce fraud, ease identity checks and enhance security.

Moreover, according to given security check proposals, there are risks of data leakage that could lead to identity theft by passport skimming or risks of offending the bearer's privacy. Skimming basically consists in fraudulently reading the user data in the chip to replicate such data in the chip of another identity document (either on a completely fake passport or on a legally issued passport).

According to the designs, the chips can be accessed either through a contact interface or through a RFID interface. As its use is far more convenient, the RFID interface tends to generalize. Various risks shall be avoided with RFID interfaces. A first risk is to have a hidden fraudulent chip reader approach the identity document and capture its data.

For preventing such risks, ICAO recommends that e-Passports be designed with Basic Access Control (BAC) features and enhanced with a Password-based mechanism according TR-SAC (Supplemental Access Control). BAC recites two protections. A first protection is that the front and back cover of the e-passport be lined with aluminum to shield the chip. This means that the passport booklet must be opened in order to communicate with the RFID interface of the chip. The second protection is the implementation of a read key consisting of a Machine Readable Zone (MRZ) on the e-passport. The MRZ is commonly a string of alphanumeric characters. The Machine Readable Zone must be scanned and its fields that are protected by check-digits are used to derive Basic Access Keys serving for confidentiality and integrity of the exchanges with the chip. Thus, a fraudulent user is thereby prevented to access the chip as long as the MRZ remains hidden.

To carry out such transactions, the cryptographic configuration (defining the cryptographic security levels supported by the chip) are stored in a memory of the chip (files EF.CardAccess and EF.DG14). The security levels are declared by the chip to the checking terminal, the terminal selects an appropriate security level available and the transaction is then carried out. One possible fraud (particularly affecting the EF.CardAccess file) would be to modify the supported security levels declared in the chip to force the use of a degraded security level during the transaction. The fraudulent user could then more easily interfere during the transaction.

Many organizations are involved in the definition of the specifications of both the controlling process and the identity support security features. In the case of the e-passports, ICAO, ISO and various national agencies are notably involved. This leads to a tedious negotiation process, necessary to guarantee that different organizations throughout the world will select identical security specifications before further improvements are validated. This is particularly complicated for electronic passports that have to be controlled in a wide range of countries throughout the world, which involves setting identical specifications in the various countries. In practice, no satisfying solution to the above security issue was found, that would be both accepted by these authorities and comply with the specifications already in force.

SUMMARY

Thus, there is a need for a security identity document solving one of these drawbacks. The invention proposes a secured identity document, comprising:
- an externally readable chip storing a cryptographic configuration of the chip for establishing a secure communication with a controlling terminal, storing a private key of a cryptography key pair and adapted to cipher data based on the stored private key;
- a support to which the chip is fastened, the support having a machine optically readable area, the data encoded in this area including:
  - said cryptographic configuration of the chip for establishing a secure communication with a controlling terminal in non ciphered form;
  - the cryptographic configuration of the chip ciphered based on said private key.

The externally readable chip may include a contactless communication interface. The chip may provide an access through the contactless communication interface to the stored cryptographic configuration without requesting the controlling terminal to authenticate.

The data encoded in the optically readable area include authentication capacities of the chip in non ciphered form and the authentication capacities of the chip ciphered based on said private key.

The chip may be adapted to:
- receive a message;
- receive a request to sign said message;
- sign said message using said private key;
- send the signed message.

The support advantageously displays identification data of the owner.

The invention also relates to a system for securely controlling the identity of an identity document bearer, comprising:
- an identity document as recited above;
- a controlling terminal comprising:
  - a device adapted to scan the machine optically readable area and to decode the data contained in the scanned area;
  - a storage area storing the public key of said cryptography key pair;
  - a processing device adapted to decipher a first part of the decoded data based on the stored public key and to compare the deciphered first part with a second part of the decoded data;
  - a communication interface configurable to establish a secure communication channel with the chip of the identity document, the security level of the secure communication being based on the decoded cryptography configuration.

The invention also relates to a Method for establishing a secure communication channel between a secured identity document and a controlling terminal, comprising the steps of:
- scanning a machine optically readable area of a support of the identity document and decoding the data contained in the scanned area;
- deciphering in the terminal a first part of the decoded data based on a public key available to the terminal, this public key belonging to a cryptography key pair, the first part of the decoded data being ciphered based on the private key of the cryptography key pair;

comparing the matching between the deciphered first part with a second part of the decoded data;

establishing a secure communication channel between the chip and the terminal based on a cryptography configuration recited in the decoded data if the deciphered first part matches the second part of the decoded data.

BRIEF DESCRIPTION OF THE DRAWINGS

The advantage of the present invention will become apparent from the following description of several embodiments with reference to the accompanying drawings, in which:

FIG. 3 is a schematic view of a terminal for carrying out a card validity check;

FIG. 4 is a flowchart illustrating an example of method for performing the invention;

DETAILED DESCRIPTION

Figure 1:
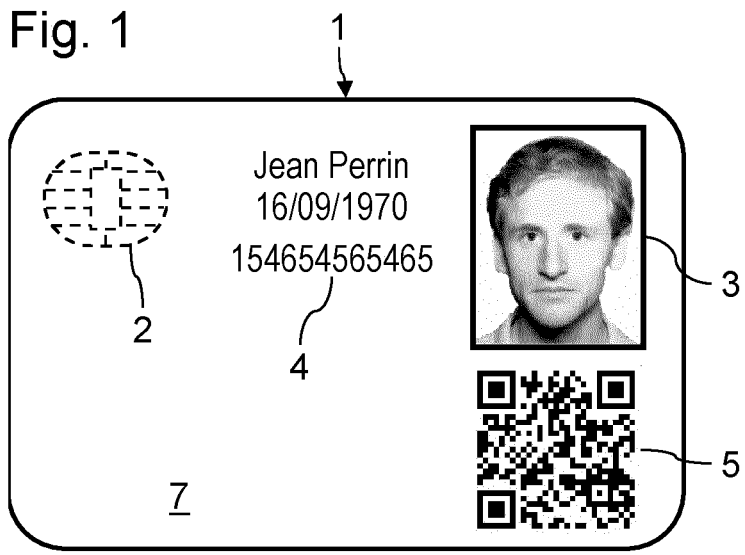
FIG. 1 is a schematic view of an identity card used in an embodiment of the invention.

FIG. 1 is a schematic view of an identity document 1 according to an embodiment of the invention. The illustrated identity document 1 is a national identity card. The identity card comprises a support 7. The support 7 can comprise fibrous layers and/or plastic layers and/or metallic layers or a combination of such layers. A picture 3 of the owner of the identity card is fastened or integrated in the support 7. The support 7 also bears alphanumeric identification data 4 relating to the owner of the card 1. The identification data 4 may comprise usual identification data known from someone ordinary skilled in the art, such as the first and last names, the date of birth, the place of birth or the like. The identification data may also comprise additional information like the number of the identity card 1 or the identification of the authority that issued the card 1.

A RFID chip 2 is fastened to the support 7. The chip 2 may be embedded between several layers of the support 7 according to techniques commonly known by someone skilled in the art.

Figure 2:
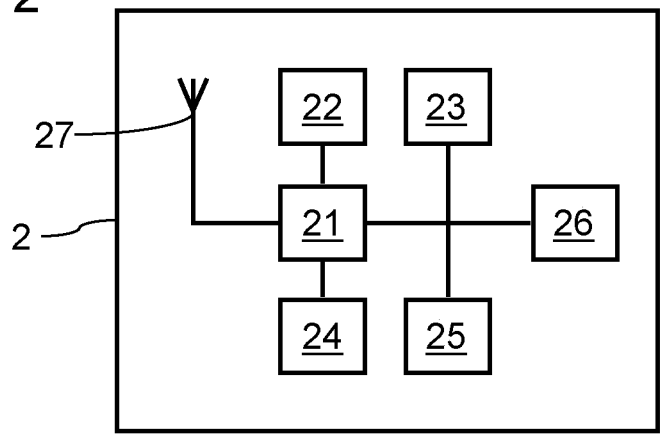
FIG. 2 is a schematic view of the structure of a chip embedded in the identity card.
Figure 5:
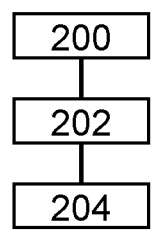
FIG. 5 is a flowchart illustrating an alternate part of the method.
Figure 6:
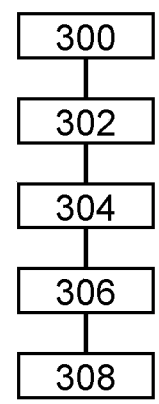
FIG. 6 is a flowchart illustrating another alternate part of the method.

As illustrated at FIG. 2, the chip 2 comprises a processor 21. The processor 21 is connected to a RAM memory 22, to a owner identification data storage area 23, to a private key storage area 24, to a cryptographic tools storage area 25 and to a cryptographic configuration storage area 26. Storage areas 23 to 26 belong to one or more non volatile memories. The processor 21 is connected to a RFID communication interface 27.

Storage area 23 is a container storing identification data relating to the card owner. This container may be a file or a data object protected against external reading by access rules such as recited in the ISO 7816-4 requirements.

The storage area 25 stores cryptographic tools. When executed by the processor 21, these cryptographic tools are notably able to perform deciphering operations using the stored private key or comparison operations.

The storage area 26 is a container storing the cryptographic configuration of the chip 2. The cryptographic configuration can comply with the EF.CardAccess requirements set in the ICAO specification named 'Supplemental Access Control for Machine Readable Travel Documents' EAC v1.11. This container is an always readable file protected against external writing by access rules such as recited in the ISO 7816-4 requirements. This cryptographic configuration is intended to be provided to a terminal in charge of checking the validity of the card 1. A terminal retrieving the cryptographic configuration of the chip 2 can thereby determine the various security levels or variants (e.g. algorithm, key length, type of mapping, type of secure messaging for PACE protocol) that the chip 2 supports for performing a security transaction. The terminal can thereby set the security level of the security transaction with chip 2.

The support 7 also comprises an optically accessible area 5 encoding data. Area 5 is machine readable. The area 5 of the example is a 2D barcode. The area 5 comprises: the cryptographic configuration of area 26 authentication capacities of chip 2 in non ciphered version, a ciphered version of the cryptographic configuration and of the authentication capacities of the chip 2. The authentication capacities of the chip 2 relate to the capacity of the chip to perform a chipcard authentication and/or to perform a terminal authentication. The ciphering of these data is performed during the manufacturing process of the card 1 based on a ciphering key. The ciphering process may in practice be a digital signature of a hash of the cryptographic configuration and of the authentication capacities. The ciphering key is a private key stored in the storage area 24. The private key is associated to a public key. The public key is provided to the control access authorities by the distributor of the card 1. The public key may be distributed in a certificate signed by the distributor.

The machine readable optical area 5 may notably be based on a 2D-barcode or a guilloche network. Encoding specifications of 2D barcodes such as QR Code, Aztec Code, PDF417 or Datamatrix can notably be used. The 2D-barcode may notably comply with the requirements set in the ISO/IEC 15415 specification. This ciphered optical area 5 may be integrated in the support by printing or engraving, by various techniques known per se by someone skilled in the art. The ciphered optical area 5 may notably be based on microprinting, on optical variable ink, on UV printing, on rainbow printing, on a diffractive optical variable device, or on changeable multiple laser image;

FIG. 3 schematically illustrates an example of system 8 for checking the validity of the card 1. The use of system 8 may for instance be performed in airport terminals or in border checkpoints. System 8 includes a terminal 81. A scanner 82 is connected to the terminal 81. The scanner 82 is controlled by an application executed on terminal 81. This application is adapted to decode the optical area 5 into binary data. The scanner 82 and the associated application may conform to the 2D barcode ISO/IEC 15426-2 specifications.

A chip reader 83 is also connected to the terminal 81. The chip reader 83 is advantageously a RFID reader suitable for communicating with chip 2 if chip 2 has no contact communication interface and is embedded inside card 1. A display 84 is also connected to terminal 81 to display the result of the card validity check and/or display various identification data concerning the owner of the card 1.

The validity check of card 1 may be performed as follows.

At step 100, the card 1 is located close to the chip reader 83. The RFID interface 26 is thus in the communication range of the chip reader 83. The optical area 5 is scanned using the scanner 82.

At step 102, the application run in the terminal 81 and associated to the scanner decodes the scanned optical area 5 into a binary data string.

At step 104, the application run in the terminal 81 retrieves the non ciphered cryptographic configuration and the non ciphered authentication capacities of the chip 2 from the binary data string.

At step 106, the application run in the terminal 81 deciphers the ciphered part of the binary data string, using the public key of the key pair shared with the chip 2.

At step 108, the application run in the terminal 81 checks that the deciphered data match the non ciphered cryptographic configuration and authentication capacities. The authenticity of the cryptographic configuration provided in area 5 is thus checked. The terminal 81 has thereby also authenticated the authentication capacities of chip 2.

At step 110, the terminal 81 establishes a secure communication channel with chip 2, based on the cryptographic configuration. Thus, even if the cryptographic configuration is freely readable by external devices, its reading cannot be used to fraudulently trigger a reduced security for the secure communication channel. The terminal 81 selects for instance the cryptographic configuration available for chip 2 that provides the highest security for the secure communication channel. The secure communication channel may be established for instance according to the BAC or PACE mechanisms recited in the EAC v1.11 and TR-SAC specifications released by the ICAO.

At step 112, the terminal 81 uses the retrieved authentication capacities to perform an active authentication of chip 2. The terminal 81 can thereby determine that chip 2 really contains the private key originally used to cipher part of area 5, which confirms that the secure communication channel was established based on the real available cryptographic configuration of chip 2.

At step 114, the terminal can request the chip 2 to compare the retrieved cryptographic configuration with the cryptographic configuration stored in area 26. The terminal 81 can thereby confirm that neither the chip 2 nor the area 5 were fraudulently altered.

At step 116, in the context of the EAC v1.11 specification, a passive authentication of the Security Object file can be carried out. This passive authentication can guarantee the integrity of the various data groups (DG) stored in chip 2.

At step 118, the chip 2 can perform a terminal authentication.

At step 120, the chip 2 has authenticated terminal 81. It thus allows the access by terminal 81 to biometric data stored in area 23.

At step 122, the biometric data retrieved by terminal 81 can be used to perform an additional security check on the card bearer.

In practice, a fraudulent user cannot successfully provide the terminal 81 with a fake cryptography configuration on area 5, since he will not be able to provide the terminal 81 with the encrypted form of this cryptography configuration.

Even if the fraudulent user provides a fake cryptography configuration on a communication channel of the terminal 81 or by altering the storage area 26, the fraud will be detected by comparing the fake cryptography configuration with the cryptography configuration retrieved from the area 5.

Various alternate methods can be designed. For instance, steps 112 to 122 can be replaced by the following steps:

At step 200, a chip authentication is carried out based on ephemeral-static Diffie-Hellman key agreement protocol (DH or ECDH) that provides secure communication and implicit unilateral authentication of the chip.

At step 202, in the context of the EAC v1.11 specification, a passive authentication of the Security Object file can be carried out.

At step 204, the chip 2 allows the access by terminal 81 to its various data groups.

Steps 112 to 122 can also be replaced by the following steps:

At step 300, a chip authentication is carried out based on ephemeral-static Diffie-Hellman key agreement protocol (DH or ECDH).

At step 302, in the context of the EAC v1.11 specification, a passive authentication of the Security Object file can be carried out.

At step 304, chip 2 can performs a terminal authentication.

At step 306, the chip 2 has authenticated terminal 81. It thus allows the access by terminal 81 to biometric data stored in area 23.

At step 308, the biometric data retrieved by terminal 81 can be used to perform an additional security check on the card bearer.

Such a method is particularly suitable to enhance the ICAO EAC v1.11 specification relating to authenticity checking of electronic passports. Indeed, the authenticity of the cryptographic configuration of chip 2 can be checked at a very early stage. Thus, the secure communication channel is established based on a reliable cryptographic configuration. Moreover, this method is not in contravention with the requirements recited in this specification. For instance, chip authentication steps can take place before terminal authentication steps.

Such a method notably allows avoiding carrying out a terminal authentication before the authenticity of the chip cryptography configuration is checked. Such a terminal authentication has been proposed for standardization to guarantee the confidentiality of the chip 2. However, such a method had the major drawback of being incompatible with the requirements of the ICAO EAC v1.11 specification.

This method can be applied to other identity documents for which the inclusion of a RFID chip is foreseen, like driving licenses, resident permits or national insurance cards.

The invention claimed is:

1. A secured electronic identity document apparatus secured against manipulation of cryptographic configuration attempts designed to compromise the level of security by which access to the secured electronic identity document is based, comprising:
   a chip, which is externally readable, storing a first representation of the cryptographic configuration of the chip, said cryptographic configuration of the chip defining the cryptographic security levels supported by the chip, said cryptographic configuration of the chip is provided to a controlling terminal allowing the controlling terminal to select an appropriate security level supported by the chip and to establish a secure communication with the chip according the selected security level, the chip storing a private key of a cryptography key pair and adapted to cipher data based on the private key;
   a support to which the chip is fastened, the support having a machine optically readable area, data encoded in this area including:
      a second representation of said cryptographic configuration of the chip for establishing a secure communication with a controlling terminal in non ciphered form;
      a third representation of said cryptographic configuration of the chip ciphered based on said private key; and, wherein the second and third representations are scannable by a scanning machine and verifiable by the controlling terminal to verify that the second representation matches the third representation by deciphering the third representation; and the chip comprising a means to check the authenticity of the cryptographic configuration of the chip on request of the controlling terminal by comparing the second or the deciphered third representations of the cryptographic configuration scanned by the controlling terminal from the machine optically readable area to the first representation of the cryptographic configuration stored into the chip and means to establish a secure communications channel according to a security level of said cryptographic configuration.

2. The secured electronic identity document apparatus according to claim 1, wherein the chip includes a contactless communication interface.

3. The secured electronic identity document apparatus according to claim 2, wherein the chip provides a free access through the contactless communication interface to the stored cryptographic configuration.

4. The secured electronic identity document apparatus according to any one of the preceding claims, wherein the data encoded in the optically readable area include authentication capacities of the chip in non ciphered form and the authentication capacities of the chip ciphered based on said private key, said authentication capacities of the chip relating to the capacity of the chip to perform a chip-card authentication and/or to perform a terminal authentication, thereby providing a mechanism by which the controlling terminal is able to check the authenticity of the authentication capacities of the chip by comparing the authentication capacities of the chip in non ciphered form to a deciphered authentication capacities of the chip based on a public key of the cryptographic pair.

5. The secured electronic identity document apparatus according to any one of claim 1, 2, or 3, wherein the chip is adapted to:
receive a message;
receive a request to sign said message;
sign said message using said private key;
send the signed message.

6. The secured electronic identity document apparatus according to any one of claim 1, 2, or 3, wherein the support displays identification data of the owner.

7. A system for securely controlling the identity of bearer of a secured electronic identity document secured against manipulation of cryptographic configuration attempts designed to compromise the level of security by which access to the secured electronic identity document is based, comprising:
a secure electronic identity document having:
a chip, which is externally readable, storing a first representation of the cryptographic configuration of the chip, said cryptographic configuration of the chip defining the cryptographic security levels supported by the chip, said cryptographic configuration of the chip is provided to a controlling terminal allowing the controlling terminal to select an appropriate security level supported by the chip and to establish a secure communication with the chip according the selected security level, the chip storing a private key of a cryptography key pair and adapted to cipher data based on the private key;
a support to which the chip is fastened, the support having a machine optically readable area, data encoded in this area including:
a second representation of said cryptographic configuration of the chip for establishing a secure communication with a controlling terminal in non ciphered form;
a third representation of said cryptographic configuration of the chip ciphered based on said private key; and
the chip comprising a means to check the authenticity of the cryptographic configuration of the chip on request of the controlling terminal by comparing the second or the deciphered third representations of the cryptographic configuration scanned by the controlling terminal from the machine optically readable area to the first representation of the cryptographic configuration stored into the chip;
a controlling terminal comprising:
a device adapted to scan the machine optically readable area and to decode the data contained in the scanned area into the second representation and the third representation;
a storage area storing the public key of said cryptography key pair;
a processing device adapted to decipher the third representation based on the stored public key and to verify that the second representation matches the third representation by deciphering the third representation;
a communication interface configurable to establish a secure communication channel with the chip of the identity document, the security level of the secure communication being based on the decoded cryptography configuration.

8. A method for establishing a secure communication channel between a secured electronic identity document secured against manipulation of cryptographic configuration attempts designed to compromise the level of security by which access to the secured electronic identity document is based and a controlling terminal, comprising the steps of:
scanning a machine optically readable area of a support of the identity document and decoding the data contained in the scanned area;
deciphering in the terminal a first part of the decoded data based on a public key available to the terminal, this public key belonging to a cryptography key pair, the first part of the decoded data being ciphered based on the private key of the cryptography key pair;
comparing the matching between a third representation of the cryptographic configuration stored in the deciphered first part with a second representation of the cryptographic configuration stored in a second part of the decoded data;
establishing a secure communication channel between a chip, which is externally readable, comprised in the secured electronic identity document and the terminal based on the cryptography configuration defining the cryptographic security levels supported by the chip and recited in the decoded data if the third representation of the cryptographic configuration in the deciphered first part matches the second representation of the cryptographic configuration stored in the second part of the decoded data, said cryptography configuration provided to the controlling terminal to select an appropriate security level supported by the chip to allow the controlling terminal to establish a secure communications channel according to the selected security level; and
checking the authenticity of the cryptographic configuration of the chip by operating the chip to, on request of the controlling terminal, to compare the second or the deciphered third representation of the cryptographic configuration stored into the machine optically readable area and scanned by the controlling terminal to a first representation of cryptographic configuration stored into the chip.

9. The secured electronic identity document apparatus according to claim 4, wherein the chip is adapted to:
   receive a message;
   receive a request to sign said message;
   sign said message using said private key;
   send the signed message.

10. The secured electronic identity document apparatus according to claim 4, wherein the support displays identification data of the owner.

* * * * *